United States Patent
Horiuchi

(10) Patent No.: US 9,308,743 B2
(45) Date of Patent: Apr. 12, 2016

(54) IMAGE FORMING APPARATUS

(75) Inventor: Izuru Horiuchi, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 10 days.

(21) Appl. No.: 12/954,172

(22) Filed: Nov. 24, 2010

(65) Prior Publication Data

US 2011/0128344 A1 Jun. 2, 2011

(30) Foreign Application Priority Data

Nov. 27, 2009 (JP) ................. 2009-270102

(51) Int. Cl.
B41J 2/45 (2006.01)
B41J 2/455 (2006.01)
B41J 2/47 (2006.01)
G03G 15/32 (2006.01)
G06K 15/12 (2006.01)
H04N 1/047 (2006.01)
G03G 15/043 (2006.01)

(52) U.S. Cl.
CPC .. *B41J 2/473* (2013.01); *B41J 2/45* (2013.01); *B41J 2/455* (2013.01); *G03G 15/326* (2013.01); *G06K 15/128* (2013.01); *G06K 15/1209* (2013.01); *G06K 15/1261* (2013.01); *H04N 1/0473* (2013.01); *G03G 15/0435* (2013.01); *H04N 2201/04796* (2013.01)

(58) Field of Classification Search
CPC ............. B41J 2/435; B41J 2/471; B41J 2/473
USPC .................. 347/131, 240, 253, 254
See application file for complete search history.

(56) References Cited

U.S. PATENT DOCUMENTS

| | | | |
|---|---|---|---|
| 4,887,225 A * | 12/1989 | Yao ................................. 358/1.5 |
| 5,995,130 A * | 11/1999 | Akatsu et al. .................. 347/254 |
| 7,003,241 B1 * | 2/2006 | Kobayashi et al. .............. 399/72 |
| 2003/0016406 A1* | 1/2003 | Hoshino et al. ............... 358/509 |
| 2003/0179428 A1* | 9/2003 | Suzuki et al. .................. 359/204 |
| 2007/0188588 A1* | 8/2007 | Shimomura .................. 347/233 |
| 2009/0003862 A1* | 1/2009 | Tominaga ....................... 399/51 |
| 2010/0060711 A1* | 3/2010 | Shibuya et al. ............... 347/233 |

FOREIGN PATENT DOCUMENTS

| JP | 02-131956 A | 5/1990 |
|---|---|---|
| JP | 3-200917 A | 9/1991 |
| JP | 2006-150772 A | 6/2006 |
| JP | 2009-039945 A | 2/2009 |

* cited by examiner

Primary Examiner — Kristal Feggins
Assistant Examiner — Kendrick Liu
(74) Attorney, Agent, or Firm — Canon USA, Inc., IP Division

(57) ABSTRACT

An image forming apparatus includes a plurality of light sources that emits a plurality of light beams arrayed in the sub-scanning direction via an optical system, a filter calculation unit that performs filter calculation of increasing or reducing a density of image data according to wideness or narrowness between a plurality of scanning lines formed on a photosensitive member when the light beams from the plurality of light sources are scanned on the photosensitive member, and a drive circuit that causes light beam emission from the plurality of light sources based on the image data that has undergone the filter calculation by the filter calculation unit.

5 Claims, 12 Drawing Sheets

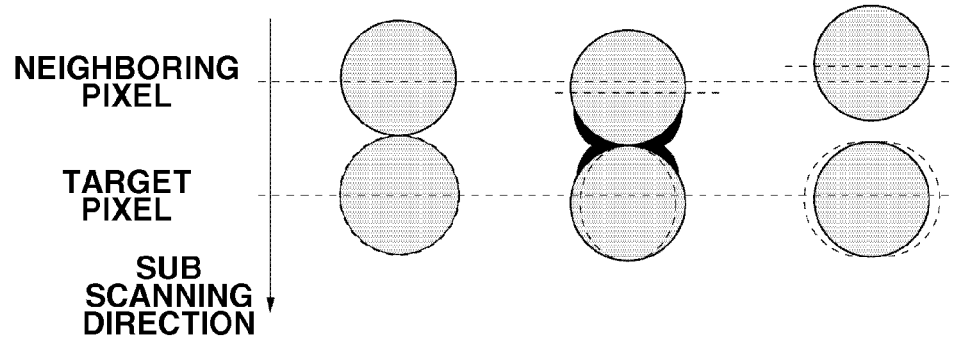

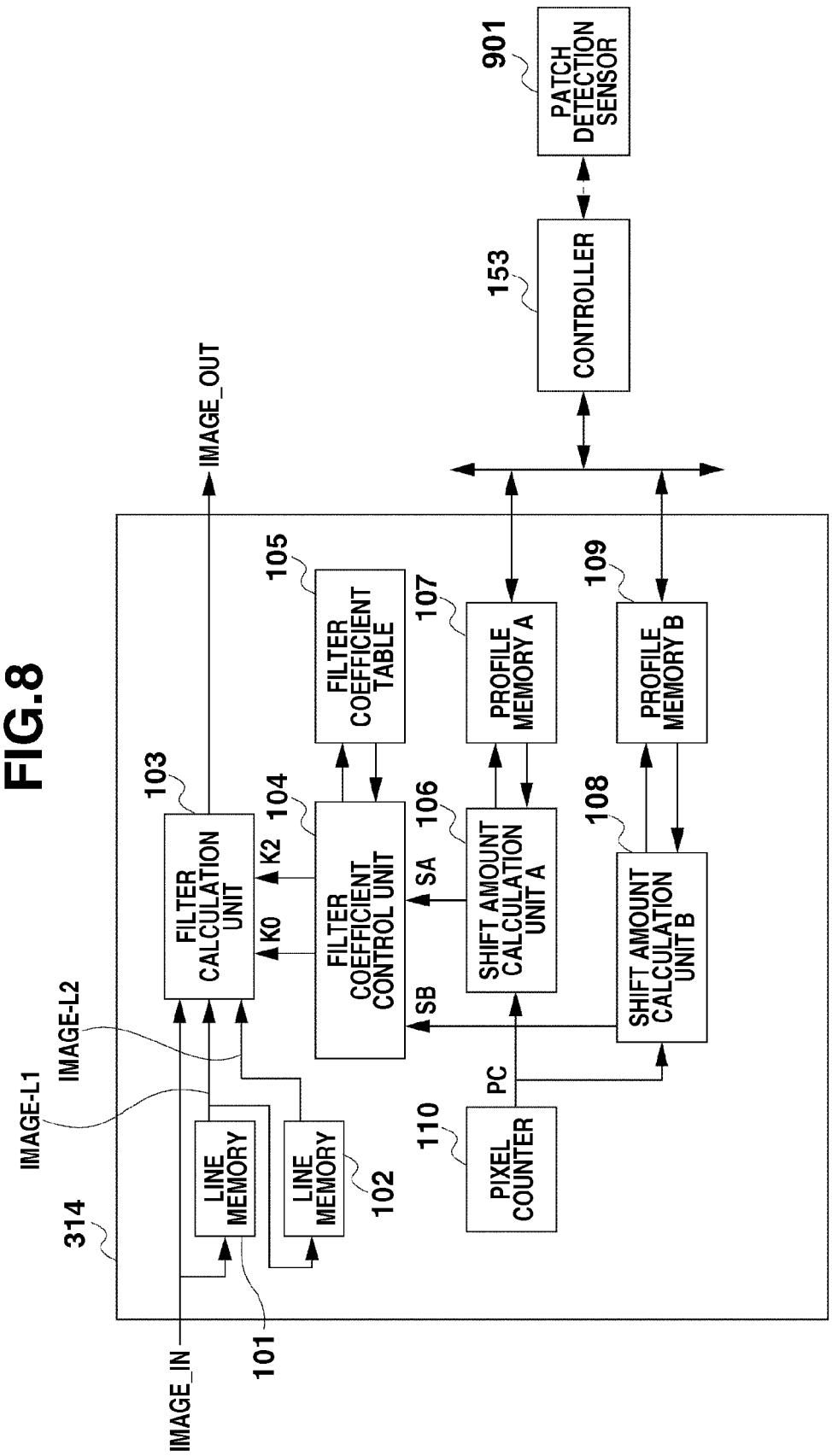

FIG.9A         FIG.9B         FIG.9C
SIMULTANEOUS SCANNING  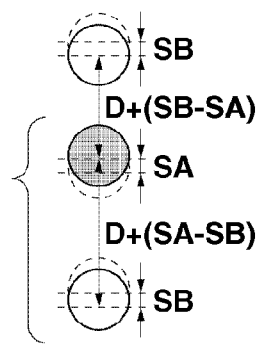 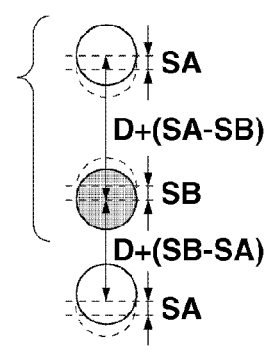

FIG.11A

PROFILE MEMORY A

| XA0 | | |
|---|---|---|
| YA0 | MA0 | NA0 |
| XA1 | | |
| YA1 | MA1 | NA1 |

FIG.11B

PROFILE MEMORY B

| XA0 | | |
|---|---|---|
| YB0 | MB0 | NB0 |
| XB1 | | |
| YB1 | MB1 | NB1 |

IMAGE FORMING APPARATUS

BACKGROUND OF THE INVENTION

1. Field of the Invention

The present invention relates to an image forming apparatus that forms a latent image on a photosensitive member by irradiating the photosensitive member with light beams based on image data by causing a plurality of light sources to emit the light beams based on the image data.

2. Description of the Related Art

In an image forming apparatus such as a copying machine and a laser beam printer using a laser beam and employing electrophotography, there has been discussed a technique that traces a plurality of scanning lines simultaneously by using a plurality of laser light sources to attain high speed printing and high resolution (Japanese Patent Application Laid-Open No. 03-200917).

However, due to different light paths of the laser beams, positions at which the laser beams pass in an optical system are varied from each other, and curvatures and inclinations of the laser beams are varied from each other in some cases. In such a case, a pitch between the scanning lines traced by the laser beams is undesirably varied depending on a main scanning position. Therefore, due to the nonuniformity of the pitches of the scanning lines, density non-uniformity occurs in a page, a background, or a predetermined region of a screen image in which uniform density should be kept.

Hereinafter, the above-mentioned issue will be described in detail. FIG. 5 is a diagram illustrating scanning lines when a photosensitive member is irradiated with laser beams emitted from light sources A and B via an optical system. A dashed dotted line indicates an ideal scanning line; a solid line indicates the scanning line by the laser beam from the light source A; and a dotted line indicates the scanning line by the laser beam from the light source B.

The scanning lines by the laser beams from the light sources A and B are curved by different degrees depending on a difference in a passing position or a reflected position in the optical system. As a result, wideness and narrowness are generated in the scanning lines by the laser beams from the light sources A and B.

For example, when the light sources A and B emit laser beams at a main scanning position X1 in the first scanning, irradiated two laser spots are closer to each other than the ideal case (the pitch between the scanning lines is narrow). In contrast, when the light source B emits a laser beam in the first scanning, and the light source A emits a laser beam in the second scanning at a main scanning position X2, the distance of the irradiated two laser spots are larger from each other than the ideal case (the pitch between the scanning lines is wide).

FIG. 6A is a diagram illustrating a latent image potential formed by two laser spots in the narrow state, and FIG. 6B is a diagram illustrating a latent image potential formed by two laser spots in the wide state. A downward direction of a vertical axis indicates a sub-scanning direction; a rightward direction of a horizontal axis indicates a surface potential of a photosensitive member 708; and a leftward direction of the horizontal axis indicates an amount of toner adhered on the photosensitive member 708 by development.

When the photosensitive member 708 is irradiated with laser in a state where a surface thereof is charged by a high negative voltage, a surface potential of the photosensitive member 708 is increased, and a latent image potential is formed. Toner is adhered by development processing on a part in which the latent image potential exceeds a threshold value Vth.

When laser spots of the light sources A and B are close to each other, a combined latent image potential is formed depending on a degree of overlapping of two latent image potentials. When latent images are formed by the laser spots in the narrow state, an overlapping part of latent image potentials is increased as illustrated in FIG. 6A to cause an increase in a region where a combined latent image potential exceeds the threshold value Vth. As a result, a toner adherence width in the sub-scanning direction is widened.

In contrast, when latent images are formed by two laser spots in the wide state, an overlapping part of latent image potentials is reduced as illustrated in FIG. 6B to cause a reduction in a region where a combined latent image potential exceeds the threshold value Vth. As a result, a toner adherence width in the sub-scanning direction is narrowed.

Therefore, density nonuniformity which is like a moiré caused by wideness and narrowness of scanning lines and interference by screen cycle is sometimes generated in a page, a background, or a predetermined region of a screen image in which uniform density should be kept.

SUMMARY OF THE INVENTION

According to an aspect of the present invention, there is provided an image forming apparatus that is configured to scan light beams corresponding to image data in a main scanning direction, irradiate a photosensitive member rotating in a sub-scanning direction with the light beams, develop a latent image formed on the photosensitive member by the light beams, and transfer the developed image onto a recording sheet, including a plurality of light sources that is configured to emit a plurality of light beams arrayed in the sub-scanning direction via an optical system, an image processing unit that is configured to perform image processing of increasing or reducing a density of the image data according to wideness or narrowness between a plurality of scanning lines that is formed on the photosensitive member when the light beams from the plurality of light sources are scanned on the photosensitive member, and a drive unit that is configured to cause light beam emission from the plurality of light sources based on the image data to which the image processing is performed by the image processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B, and 7C are diagrams each illustrating a region of toner adhered on a latent image by two laser spots.

FIG. 8 is a block diagram illustrating a laser pitch correction unit.

FIGS. 9A, 9B, and 9C are diagrams each illustrating a method for detecting a laser spot distance between a target pixel and a neighboring pixel.

FIGS. 11A and 11B are diagrams each illustrating profile data stored in a profile memory.

DESCRIPTION OF THE EMBODIMENTS

Various exemplary embodiments, features, and aspects of the invention will be described in detail below with reference to the drawings.

Figure 1:
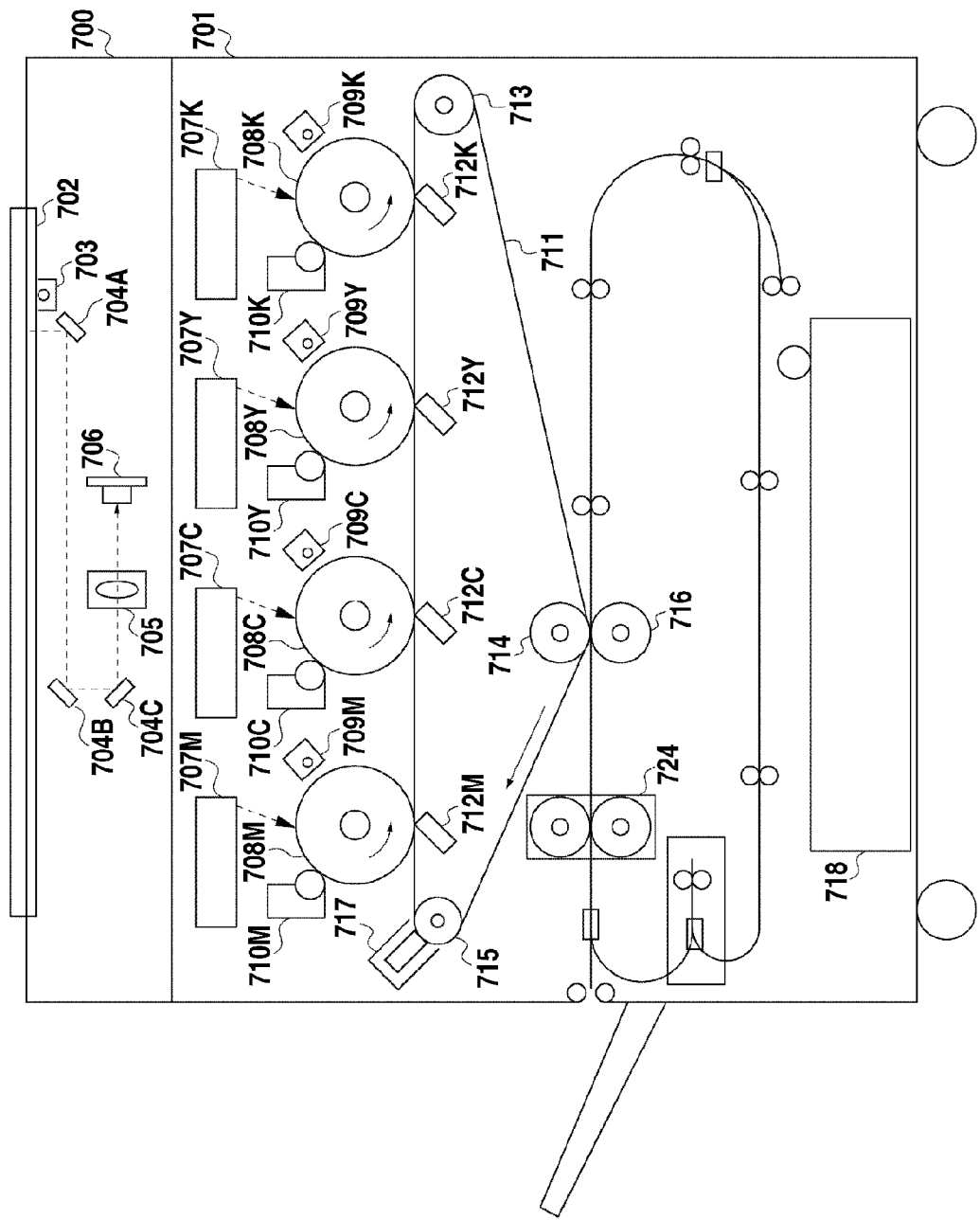
FIG. 1 is a sectional view illustrating an image forming apparatus according to an exemplary embodiment of the present invention.

FIG. 1 is a sectional view illustrating an image forming apparatus according to an exemplary embodiment of the present invention.

An original document scanner 700 forms onto a color image sensor 706 an image on a platen glass 702 via an illuminating lamp 703, mirrors 704A, 704B, and 704C, and a lens 705, and reads color components of blue (B), green (G), and red (R) of the color image of the original document to convert the color components into electrical image signals. Color image data of black (K), cyan (C), magenta (M), and yellow (Y) are obtained by performing color conversion processing on the B, G, R image signals obtained by the original document scanner 700.

In a printer 701, laser scanners 707 (M, C, Y, and K added to the reference numerals indicate colors for image formation; same applies to the following) emit laser beams corresponding to the color image data from the original document scanner 700, so that electrostatic latent images corresponding to the original document image are formed on photosensitive members 708 which are rotatably driven in a sub-scanning direction.

A charger 709, a developer 710, an intermediate transfer belt 711, and a first transfer bias blade 712 are provided around each of the photosensitive members 708. The intermediate transfer belt 711 is stretched around a driving roller 713 and driven rollers 714 and 715. A second transfer bias roller 716 is disposed at a position opposed to the driven roller 714 of the intermediate transfer belt 711. A belt cleaning unit 717 is provided at a predetermined position opposed to the driven roller 715 at a surface of the intermediate transfer belt 711.

The electrostatic latent images on the photosensitive members 708 are developed by the developers 710. Each of developed toner images on the photosensitive members 708 is transferred onto the intermediate transfer belt 711 by the second bias roller 716. The toner image transferred onto the intermediate transfer belt 711 is transferred by the second bias roller 716 onto a recording paper (recording sheet) fed from a cassette 718. The toner image on the recording sheet is fixed by a fixing device 724.

Figure 2A:
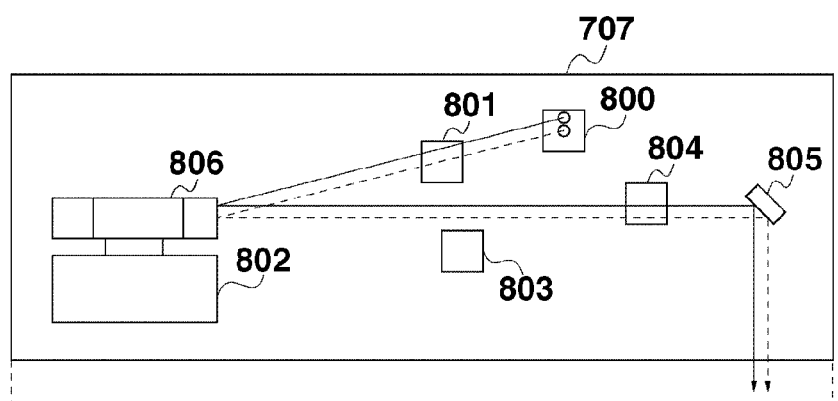
FIG. 2A and FIG. 2B are sectional views each illustrating a laser scanner.
Figure 2B:
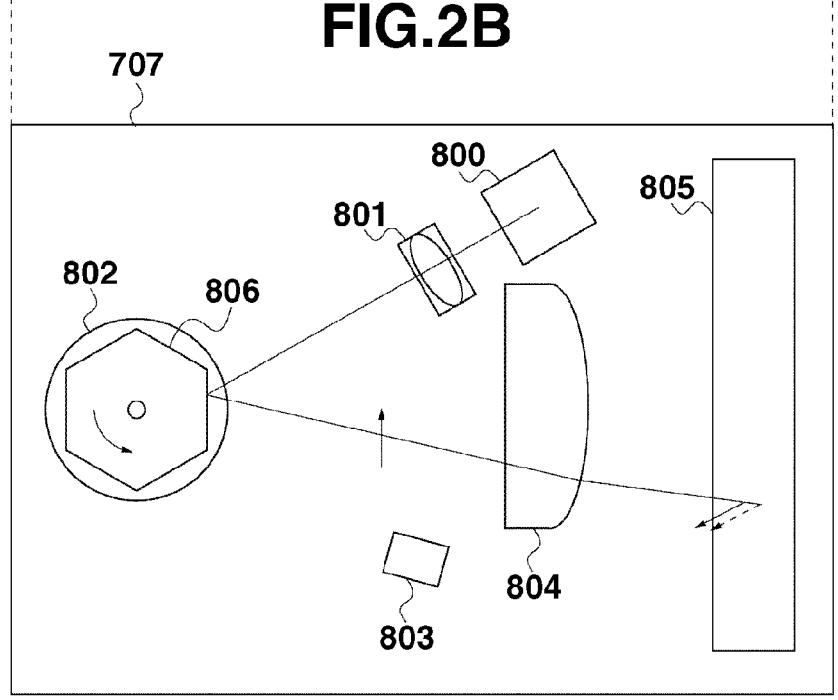

FIG. 2A is a side sectional view illustrating the laser scanner 707, and FIG. 2B is a top sectional view of FIG. 2A. A light emitting element unit 800 includes two light sources (light sources A and B from a leading end of a sub-scanning direction) that emit laser beams corresponding to the image data. The light emitting element unit 800 simultaneously performs laser beam emissions for two lines by the light sources A and B. Light paths of the laser beams emitted from the light sources A and B are indicated by a solid line and a dashed line, respectively.

The photosensitive member 708 is irradiated with the two laser beams that are emitted from the light emission element unit 800 via the optical system (lens 801, polygon mirror 806, fθ lens 804, flat mirror 805) and arrayed in the sub-scanning direction of the photosensitive member 708. The polygon mirror 806 having six reflection faces at its lateral part is rotatably driven by a polygon motor 802.

By one rotation of the polygon mirror 806, the polygon mirror 806 causes six times of deflection scanning by the laser beams emitted from the light emission element unit 800. A detection element 803 detects the laser beams deflected by the polygon mirror 806, and outputs beam detect (BD) signals which trigger the start of exposure of main scanning lines.

Figure 3:
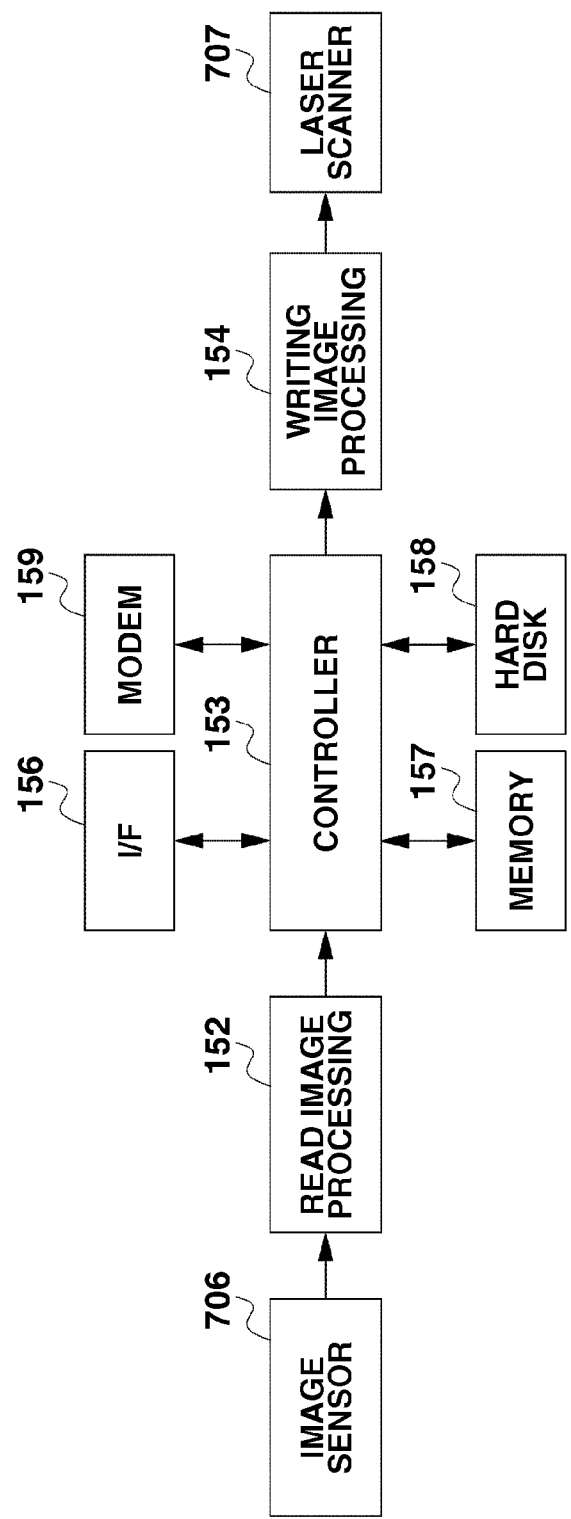
FIG. 3 is a block diagram illustrating an image processing unit.

FIG. 3 is a block diagram illustrating an image processing unit that performs image processing on image data output from the original document scanner 700 and outputs the processed image data to the laser scanner 707.

A read image processing unit 152 performs shading correction, color conversion processing, noise elimination, and the like on the RGB signals output from the image sensor 706 to correct fluctuation and characteristics of the optical system including the image sensor 706.

A controller 153 receives the image data output from the read image processing unit 152 and stores the image data in a memory 157 after performing image compression as required. Also, the controller 153 rasterizes data received from a computer via an interface 156 or rasterizes a facsimile image received via a modem 159 to store the data or image in the memory 157.

Further, the controller 153 stores on a hard disk 158 the image that has once been stored in the memory 157, thereby realizing smooth printing that is not restricted by an order of input or output of images. In the printing, the controller 153 sends the image data stored in the memory 157 or the hard disk 158 to a writing image processing unit 154.

The writing image processing unit 154 performs image processing such as conversion from RGB data into YMCK data, conversion corresponding to a color gamut of a printer, two-dimensional correction of frequency characteristics, gradation correction, gradation number conversion, and resolution conversion to send the image data after the image processing to the laser scanner 707. The laser scanner 707 forms a latent image on the photosensitive member 708 by receiving the image data from the writing image processing unit 154, converting the image data into pulse width modulated (PWM) signals, driving the light sources A and B by an internal laser drive circuit, and causing emission of laser beams.

Figure 4:
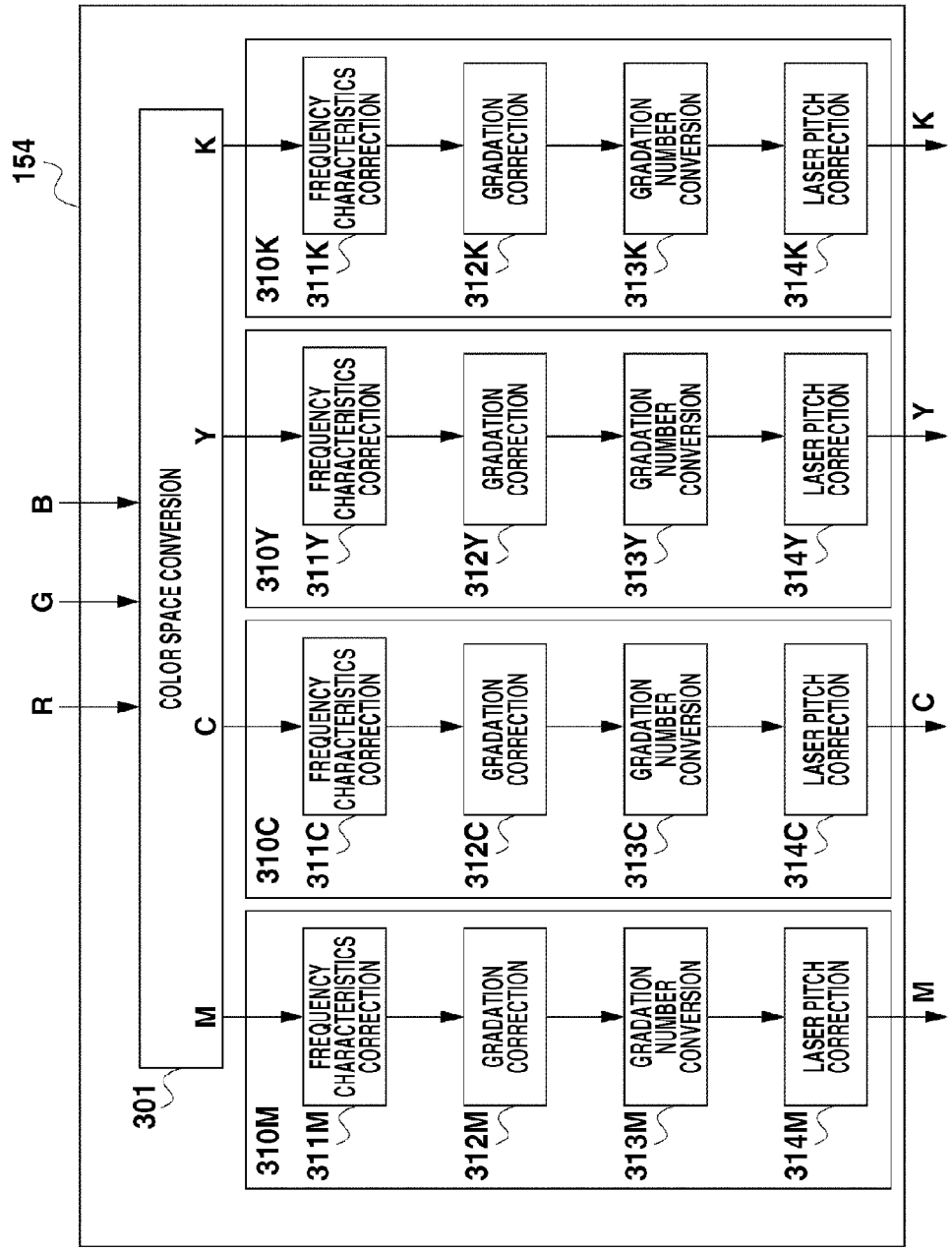
FIG. 4 is a block diagram illustrating a writing image processing unit.

FIG. 4 is a block diagram illustrating the writing image processing unit 154.

A color space conversion unit 301 receives 10 bit RGB data (brightness data), and converts the 10 bit RGB data into 10 bit YMCK data (density data) to be output. A correction unit 310 performs frequency characteristics correction, gradation correction, gradation number correction, and scanning line pitch correction. A frequency characteristics correction unit 311 performs correction of frequency characteristics for each colors and filtering of appropriate characteristics according to the image processing adapted to a gradation number conversion unit 313 at a later stage.

A gradation correction unit 312 adjusts a gradation according to the gradation number conversion unit 313 at the later stage and environmental fluctuation based on a feed back of a test pattern or the like. A laser pitch correction unit 314 corrects or compensates a density nonuniformity caused by wideness and narrowness of a scanning pitch.

Figure 5:
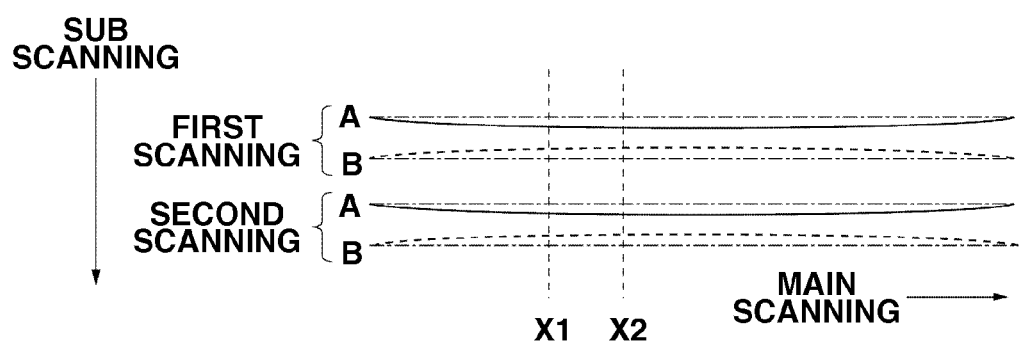
FIG. 5 is a diagram illustrating scanning lines projected on a photosensitive member.

FIG. 5 is a diagram illustrating scanning lines when the photosensitive member 708 is irradiated with laser beams emitted from the light sources A and B of the light emission element unit 800 via the optical system. A dashed dotted line indicates an ideal scanning line; a solid line indicates the scanning line by the laser beam from the light source A; and a dashed line indicates the scanning line by the laser beam from the light source B.

The scanning lines by the laser beams from the light sources A and B are curved by different degrees depending on a difference in a passing position or a reflection position in the optical system. As a result, wideness and narrowness are generated in the scanning lines by the laser beams from the light sources A and B. For example, when the light sources A and B emit laser beams at a main scanning position X1 in the first scanning, irradiated two laser spots are closer to each other than the ideal case (the pitch between the scanning lines is narrow).

On the other hand, when the light source B emits a laser beam in the first scanning and the light source A emits a laser beam in the second scanning at a main scanning position X2, the distance of the irradiated two laser spots are larger from each other than the ideal case (the pitch between the scanning lines is wide).

Figure 6A:
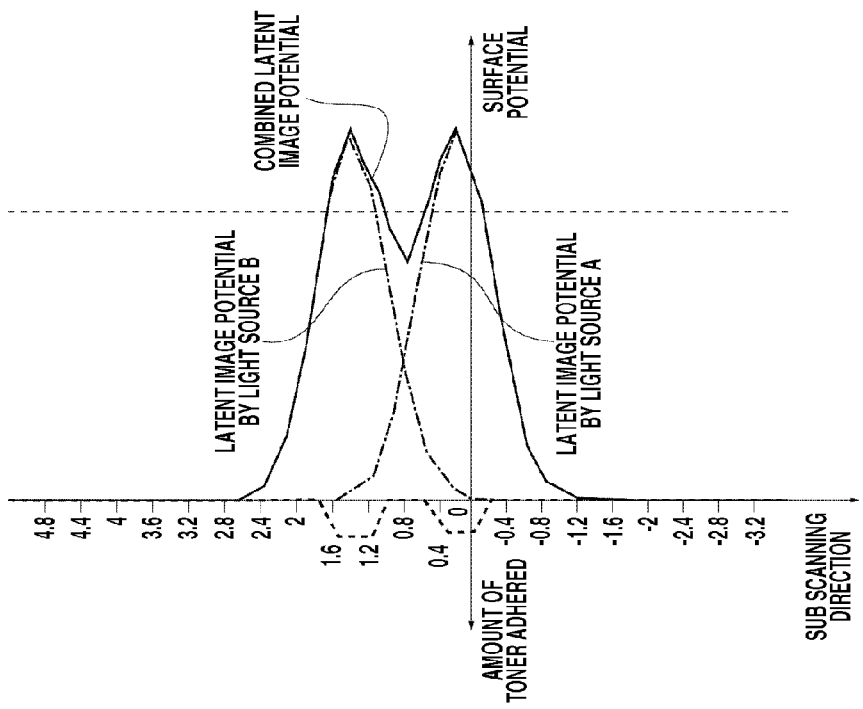
FIGS. 6A and 6B are diagrams each illustrating latent image potentials that are formed by two laser spots.
Figure 6B:
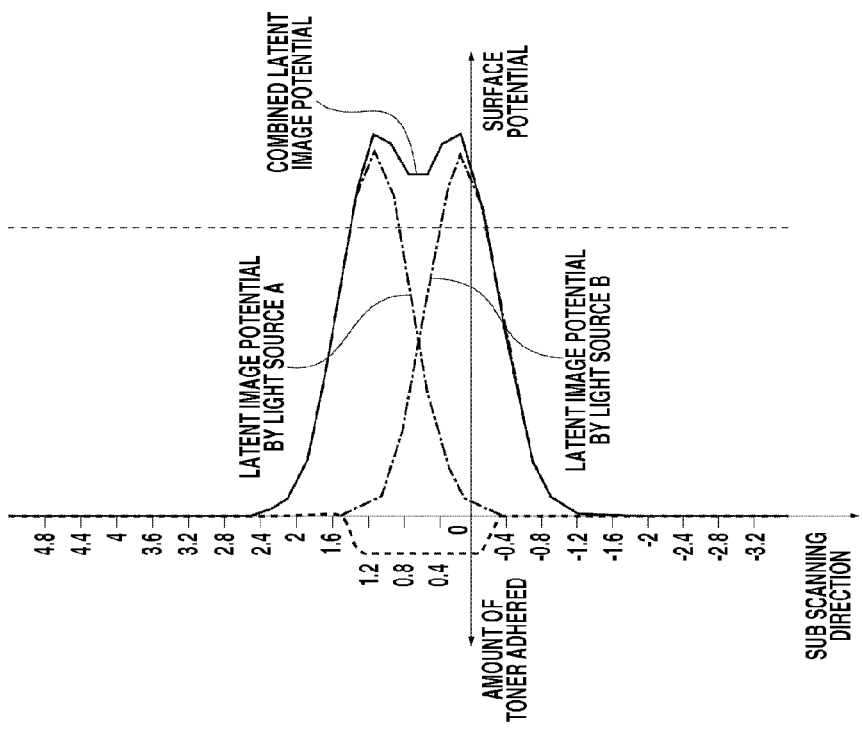

FIG. 6A is a diagram illustrating latent image potentials formed by two laser spots in the narrow state, and FIG. 6B is a diagram illustrating latent image potentials formed by two laser spots in the wide state. A downward direction of a vertical axis indicates a sub-scanning direction; a rightward direction of a horizontal axis indicates a surface potential of a photosensitive member 708; and a leftward direction of the horizontal axis indicates an amount of toner adhered on the photosensitive member 708 by development.

When the photosensitive member 708 is irradiated with laser beams in a state where a surface thereof is charged by a high negative voltage, a surface potential of the photosensitive member 708 is increased, and latent image potentials are formed. Toner is adhered by development processing on a part in which the latent image potential exceeds a threshold value Vth. When laser spots of the light sources A and B are close to each other, a combined latent image potential is formed depending on a degree of overlapping of the two latent image potentials.

When a latent image is formed by two laser spots in the narrow state, an overlapping part of latent image potentials is increased as illustrated in FIG. 6A to cause an increase in a region where a combined latent image potential exceeds the threshold value Vth. As a result, a toner adherence width in the sub-scanning line is widened.

On the other hand, when a latent image is formed by two laser spots in the wide state, an overlapping part of latent image potentials is reduced as illustrated in FIG. 6B to cause a reduction in a region where a combined latent image potential exceeds the threshold value Vth. As a result, a toner adherence width in the sub-scanning line is narrowed.

FIG. 7A is a diagram illustrating a region of toner adhered on a latent image by two ideal laser spots, FIG. 7B is a diagram illustrating a region of toner adhered on a latent image by two laser spots in the narrow state, and FIG. 7C is a diagram illustrating a region of toner adhered on a latent image by two laser spots in the wide state. A blackened region in FIG. 7B indicates a part in which the latent image potential exceeds the threshold value Vth due to overlapping of latent image potentials.

As is apparent from the drawings, the toner region is larger than the ideal one when the two laser spots are in the narrow state, while the toner region is smaller than the ideal one when the two laser spots are in the wide state. Accordingly, in the above-described laser pitch correction unit 314, a density of a target pixel in the image data is reduced when the laser spots of the target pixel and a neighboring pixel in the sub-scanning direction are in the narrow state. In contrast, a density of a target pixel in the image data is increased when the laser spots of the target pixel and a neighboring pixel in the sub-scanning direction are in the wide state.

In other words, image processing for increasing or reducing density of the image data is performed according to wideness or narrowness between a plurality of scanning lines on the photosensitive member formed by a plurality of times of scanning by the light beams from the two light sources on the photosensitive member.

The image data output from the laser pitch correction unit 314 are subjected to the PWM conversion by the laser scanner 707, and a width in the main scanning direction of a laser spot corresponding to each of the pixels becomes a width corresponding to a density value of each of the pixels. Therefore, when the laser spot of the target pixel and the laser spot of the neighboring pixel in the sub-scanning direction are in the narrow state, the width of the laser spot in the main scanning direction is reduced, and the toner region is reduced as indicated by the dashed line in FIG. 7B to approach to the ideal one.

Also, when the laser spot of the target pixel and the laser spot of the neighboring pixel in the sub-scanning direction are in the wide state, the width of the laser spot in the main scanning direction is increased, and the toner region is increased as indicated by the dashed line in FIG. 7C to approach to the ideal one.

FIG. 8 is a block diagram illustrating the laser pitch correction unit 314.

Image data for three lines input into the laser pitch correction unit 314 are input into a filter calculation unit 103. The image data IMAGE_L2 of the line N−1 and the image data IMAGE_L1 of the line N are input into the filter calculation unit 103 via a line memory 102 and a line memory 101, respectively, and the image data IMAGE_IN of the line N+1 are directly input into the filter calculation unit 103. Each of the line memories 101 and 102 is capable of storing image data for one main scanning line.

A pixel counter 110 outputs the main scanning position information of a pixel (target pixel) to be subjected to filter calculation by the filter calculation unit 103. The pixel counter 110 counts up the pixels according to clocks by the unit of pixels for transferring the image data IMAGE_IN and is reset when the final pixel of one main scanning line is counted.

The filter calculation unit 103 performs the filter calculation by using as a target pixel a pixel at a main scanning position indicated by the pixel counter 110 among the image data of the line N and using values of neighboring pixels (line N−1 and line N+1) and filter coefficients for a value of the target pixel.

More specifically, the filter calculation unit 103 performs the filter calculation based on the image data IMAGE_L1 of the line N, the image data IMAGE_L2 of the line N−1, the filter coefficient K2, the image data IMAGE_IN of the line N+1, and the filter coefficient K0 to output image data IMAGE_OUT after the calculation:

IMAGE_OUT=IMAGE_IN×K0+IMAGE_*L*1+IMAGE_*L*2×K2.

The filter coefficient K2 has a negative value when the laser spot of the neighboring pixel of the line N−1 and the laser spot of the target pixel are closer than the ideal ones, and has a positive value when the laser spots are farther than the ideal ones.

In the same manner, the filter coefficient K0 has a negative value when the laser spot of the neighboring pixel of the line N+1 and the laser spot of the target pixel are closer than the ideal ones, and has a positive value when the laser spots are farther than the ideal ones. In short, a density of the target pixel is reduced when the distance of the laser spot of the target pixel and the laser spot of the neighboring pixel is smaller (pitch between scanning lines is narrow), and a density of the target pixel is increased when the distance of laser spot of the target pixel and the laser spot of the neighboring pixel is larger (pitch between scanning lines is wide).

As described above, the density of the image data IMAGE_L1 of the target pixel is increased or reduced according to a degree of wideness or narrowness to a laser spot of the neighboring pixel in the sub-scanning direction and the image data IMAGE_L2 and IMAGE_IN of the neighboring pixels in the sub-scanning direction, so that the image data IMAGE_OUT are output.

A filter coefficient control unit 104 obtains the filter coefficients K0 and K2 corresponding to the distances between the target pixel and the neighboring pixels with reference to a filter coefficient table 105 to supply the filter coefficients K0 and K2 to the filter calculation unit 103. The filter coefficient control unit 104 obtains the laser spot distances between the target pixel and the neighboring pixels based on an ideal laser spot distance, a shift amount from an ideal position of the laser spot of the target pixel, and shift amounts from ideal positions of the laser spots of the neighboring pixels.

FIGS. 9A, 9B, and 9C are diagrams illustrating a method for determining or detecting the laser spot distances between the target pixel and the neighboring pixels. FIG. 9A illustrates an ideal laser spot distance D. FIG. 9B illustrates a method for determining or detecting laser spot distances between a target pixel and neighboring pixels when the laser beam for the target pixel is emitted from the light source A. Shift amounts SA and SB indicate shift amounts from ideal positions of laser spots of the light sources A and B, wherein a shift in an upward direction (in a direction reverse to the sub-scanning direction) is indicated as positive, and a shift in a downward direction (in the sub-scanning direction) is indicated as negative.

The laser spot distance between the target pixel and the upper neighboring pixel is detected by D+(SB−SA), and the laser spot distance between the target pixel and the lower neighboring pixel is detected by D+(SA−SB).

FIG. 9C illustrates a method for detecting laser spot distances between a target pixel and neighboring pixels when the laser beam for the target pixel is emitted from the light source B. The laser spot distance between the target pixel and the upper neighboring pixel is detected by D+(SA−SB), and the laser spot distance between the target pixel and the lower neighboring pixel is detected by D+(SB−SA).

The shift amounts SA and SB are acquired by a shift amount calculation unit A 106 and a shift amount calculation unit B 108 with reference to a profile memory A 107 and a profile memory B 109, and supplied to the filer coefficient control unit 104. The filter coefficient control unit 104 obtains the laser spot distances between the target pixel and the neighboring pixels by the above-described equations of the shift amounts SA and SB.

Figure 10:
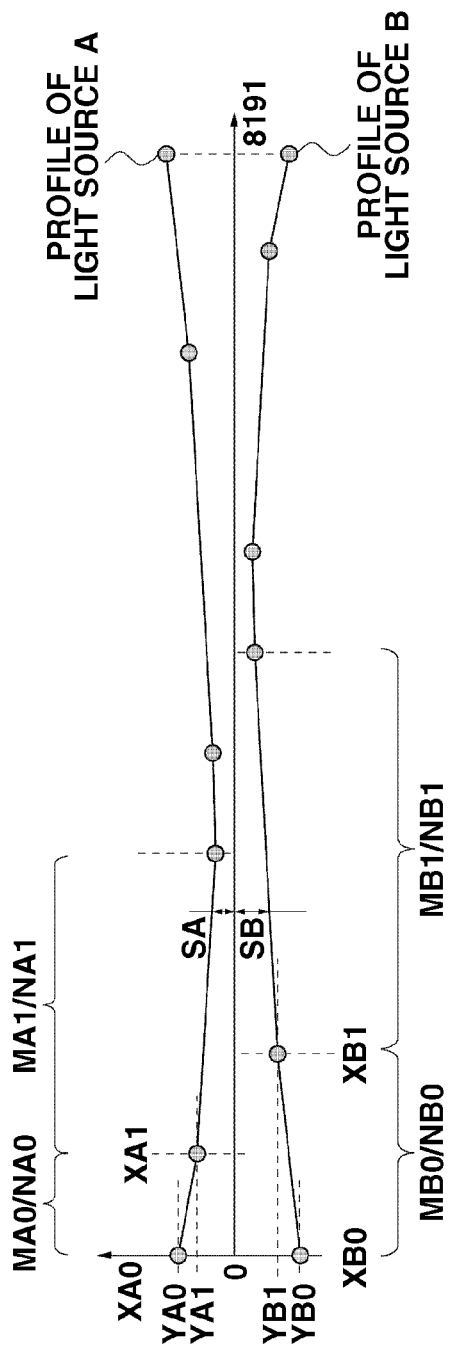
FIG. 10 is a diagram illustrating profiles of light sources A and B.

The shift amount calculation unit A 106 and the shift amount calculation unit B 108 obtain the shift amounts SA and SB based on scanning line profiles of the light sources A and B. FIG. 10 is a diagram illustrating scanning line profiles of the light sources A and B. Actual scanning line profiles of the light sources A and B are curves, but, to reduce a data amount to be stored in the profile memories, the profile curves are subjected to straight line approximation by one dimensional spline interpolation, and only the profile data of change points are stored in the profile memory A 107 and profile memory B 109.

FIGS. 11A and 11B are diagrams illustrating scanning line profile data (coordinate data of change points and change rate data) stored in the profile memory A 107 and profile memory B 109.

As is apparent from FIG. 10, the shift amount SA in each of the main scanning positions is obtained by the following expression based on coordinate data XAn and YAn of the change points and change rate data MAn/NAn, and, likewise, the shift amount SB in each of the main scanning positions is obtained by the following expression based on coordinate data XBn and YBn of the change points and change rate data MBn/NBn. Indicated by YAn is the shift amount at the main scanning line position XAn of the laser spot of the light source A, and indicated by YBn is the shift amount at the main scanning line position XBn of the laser spot of the light source B.

Also, X represents a main scanning position indicated by the count value of the pixel counter 110. As XAn, XAn that satisfies XAn≤X<XAn+1 is used. The shift amount calculation unit A 106 and the shift amount calculation unit B 108 read the profile data from the profile memory A 107 and the profile memory B 109 and obtain the shift amounts SA and SB by the following expressions:

$$SA = YAn + (MAn/NAn) \times (X - XAn) \text{ and}$$

$$SB = YBn + (MBn/NBn) \times (X - XBn).$$

The scanning line profile of each of the light sources A and B of the light emission element unit 800 is measured in production of the image forming apparatus, and the scanning line profile data are written into the profile memory A 107 and the profile memory B 109 by the controller 153. The profile memory A 107 and the profile memory B 109 are nonvolatile memories.

Figure 12:
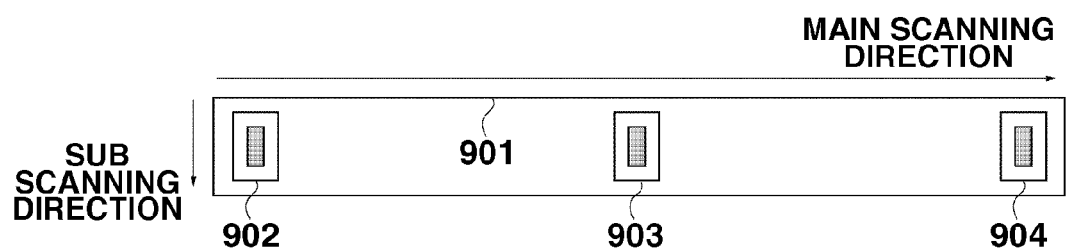
FIG. 12 is a diagram illustrating an appearance of a patch detection sensor for measuring the profiles of the light sources A and B.

FIG. 12 is a diagram illustrating an appearance of a patch detection sensor 901 for measuring the profiles of the light sources A and B. The patch detection sensor 901 is mounted in the vicinity of each of the photosensitive members 708M, 708C, 708Y, and 708K temporarily during the profile measurement in the production process of the image forming apparatus and electrically connected to the controller 153.

A line sensor 902 reads a patch image on a left end of the main scanning of the photosensitive member 708; a line sensor 903 reads a patch image on a central part of the main scanning of the photosensitive member 708; and a line sensor 904 reads a patch image on a right end of the main scanning of the photosensitive member 708. The line sensors 902, 903, and 904 output the image data of the patch images to the controller 153.

The controller 153 causes patch images (each is square and has uniform density) to be formed at the left end part, the central part, and the right end part in the main scanning direction on the photosensitive member 708. The controller 153 causes the three patch images to be formed on a theoretically identical sub-scanning position, and obtains profiles by quadric approximation of the sub-scanning positions of the patch images output from the patch detection sensor 901.

In the measurement of profiles, to measure the profile of each of the light sources A and B, the controller 153 performs the patch image formation and the patch image detection using the light source A alone, and the patch image formation and the patch image detection using the light source B alone. After the obtaining of the profiles of the light sources A and B, the controller 153 writes the profile data into the profile memory A 107 and the profile memory B 109.

Though the number of the light sources in the light emission element unit 800 is two in the above-described exemplary embodiment, the present invention is applicable to an image forming apparatus having three or more light sources.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-270102 filed Nov. 27, 2009, which is hereby incorporated by reference herein in its entirety.

What is claimed is:

1. An image forming apparatus configured to irradiate a photosensitive member rotating in a sub-scanning direction with light beams, with which the photosensitive member is scanned in a main scanning direction perpendicular to the sub-scanning direction, to form a latent image, develop the latent image formed on the photosensitive member, and transfer the developed image onto a recording sheet, the image forming apparatus comprising:
- a plurality of light sources configured to emit a plurality of light beams via an optical system the plurality of light beams being used to scan different positions on the photosensitive member in the sub-scanning direction;
- a storage unit configured to store a profile and a table by correlating them with each of the plurality of light sources,
   wherein information indicating a shift amount from an ideal position of a scanning line of the corresponding light source in the sub-scanning direction with respect to each of a plurality of positions of the scanning line in the main scanning direction is stored in the profile,
   wherein a correspondence relation between a distance and a coefficient is stored in the table, and
   wherein the distance is between a peripheral pixel and a target pixel in the sub-scanning direction;
- a setting unit configured to calculate a target shift amount from the ideal position corresponding to the target pixel by referring the profiles based on the position information of the target pixel in the main scanning direction and set a target coefficient for the target pixel by referring the table based on the target shift amount, an upstream peripheral shift amount corresponding to an upstream peripheral pixel and a downstream peripheral shift amount corresponding to a downstream peripheral pixel;
- an image processing unit configured to correct a value of the target pixel so that a density of the target pixel is increased or reduced according to wideness or narrowness between a plurality of scanning lines formed on the photosensitive member at a position of the target pixel based on a value of the upstream peripheral pixel and a value of the downstream peripheral pixel in a sub-scanning direction and the set target coefficient for the target pixel when the photosensitive member is scanned with the light beams from the plurality of light sources; and
- a drive unit configured to cause light beam emission from the plurality of light sources based on the image data to which the image processing is performed by the image processing unit.

2. The image forming apparatus according to claim 1, wherein the setting unit obtains a first distance between the position of the target pixel and a position of the upstream peripheral pixel in the sub-scanning direction, and a second distance between the position of the target pixel and a position of the downstream peripheral pixel based on the profile data stored in the storage unit and sets the coefficient based on the first and second distance in the sub-scanning direction.

3. The image forming apparatus according to claim 2, wherein the setting unit obtains a shift amount of the position of the upstream peripheral pixel from an ideal position and a shift amount of the position of a target pixel from an ideal scanning line and the position of the downstream peripheral pixel from an ideal position, based on the profile data stored in the storage unit, to obtain the first and second distances.

4. The image forming apparatus according to claim 1, wherein the narrower a pitch between the scanning lines is, the more the image processing unit reduces the density of the image data.

5. The image forming apparatus according to claim 1, wherein the wider a pitch between the scanning lines is, the more the image processing unit increases the density of the image data.

* * * * *